June 25, 1963     R. G. KAHKONEN ETAL     3,094,864
OMNI-DIRECTIONAL VIBRATION AND ACCELERATION SENSING TRANSDUCER
Filed Oct. 12, 1960
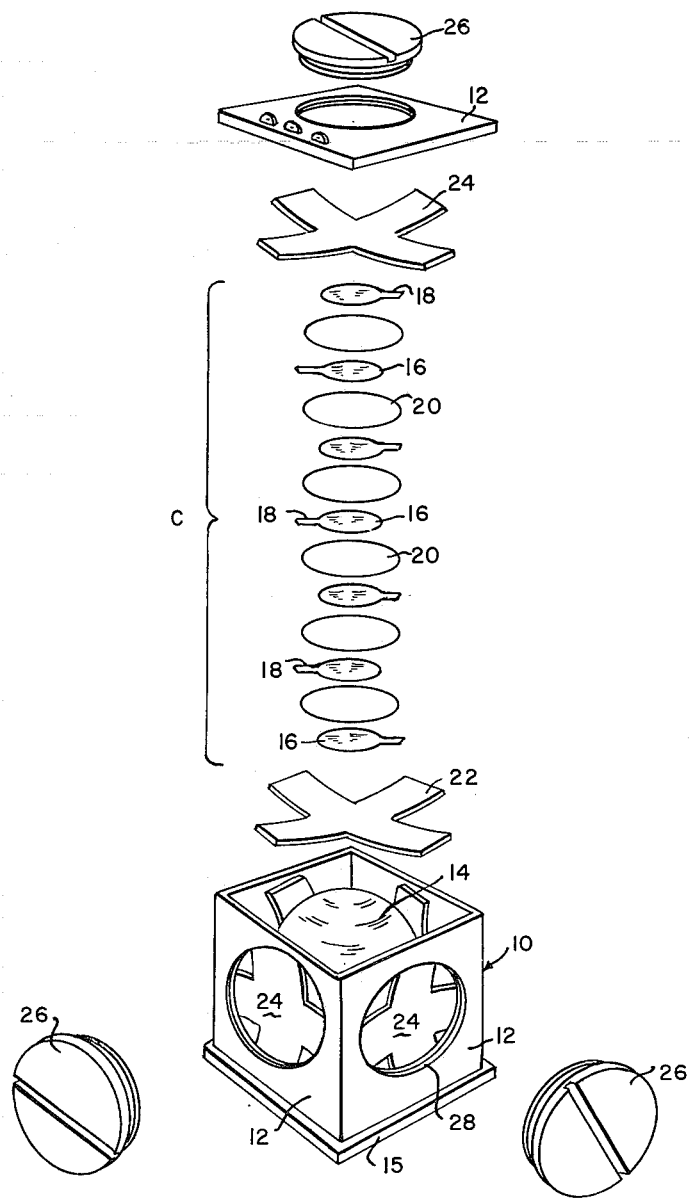
INVENTORS
ROY G. KAHKONEN
ROBERT A. BARTLETT
BY
ATTORNEYS

3,094,864
OMNI-DIRECTIONAL VIBRATION AND ACCELERATION SENSING TRANSDUCER
Roy G. Kahkonen and Robert A. Bartlett, Fort Walton, Fla., assignors to the United States of America as represented by the Secretary of the Air Force
Filed Oct. 12, 1960, Ser. No. 62,313
2 Claims. (Cl. 73—71.2)

This invention relates to a capacitive type omni-directional transducer which comprises a cubic structure housing six capacitor elements, two opposed capacitors positioned on each of three axes. The device operates on the principle of capacitive changes which occur in these elements when acted upon by a centrally located spherical mass of selected density, the spherical mass reacting to external forces. The device is capable of response to forces from any plane or planes, converting these forces into corresponding capacitive changes.

In the drawing, the FIGURE represents a perspective view of the transducer showing one side of the device and one of the capacitive units in exploded condition.

The six capacitors are contained in a cubical structure or transducer body indicated in the drawing at 10. The cubical transducer body structure 10 is comprised of six plane sides 12 and may be supported by any expedient means. The means shown is a mounting frame 15 surrounding the periphery of one of the sides of the structure 10.

In each of the three major axes of the cubical body 10 there are two sets of capacitive elements separated by a heavy metal mass 14 of selected density and may be a cube or a sphere, as desired.

Each capacitor comprises the following elements: a plurality (seven as shown) of capacitor elements 16 are deformable resilient metal plates capable of flexing and returning to original shape. They may be convexed or shallow saucer shaped elements of any suitable metal. A good grade of brass, silicon bronze, steel shim stock or gold plated steel are examples of materials found suitable for this purpose. The capacitor plates 16 are provided with contact or lead elements 18 which connect into a standard circuit (not shown) whose character is determined by the particular purpose for which the transducer is to be used.

The capacitor plates 16 are sandwiched with flexible dielectric separators 20. These insulator disks may range, for example, from 0.0001 to .005" depending on the capacitive range and sensitivity desired. They are made of mica, plastic, glass or other insulating material found suitable.

The unit comprising the capacitor plates 16 and the sandwiched mica separators 20 are encapsulated, except for the protruding terminals 18 in a polystyrene or similar plastic film. The units to be encapsulated are designated in the drawing by the letter C. The unit thus assembled will respond to pressure by "flattening out," as space under each deformed plate is diminished.

For each capacitor unit inner and outer spring negator plates are provided, as shown at 22 and 24 respectively. The inner spring plate 22 receives the impulse from the mass 14 and transmits it to the encapsulated capacitor unit C. The outer plate 24 is interposed between the capacitor unit C and an inner adjacent surface of a side 12 of the body 10. The negator plates do not enter into the electrical characteristics of the device since the wanted measurements are taken from instruments (not shown) connected to the terminals 18. They are, however, important in the system because they act to diminish mechanical hysteresis which has an electrical analogue value.

The "negator plates" are deformed metallic springs that flatten or deflect from a slightly cupped or saucer-like cross-section when impressed by movement of the central mass. Since they are pre-formed to the cupped shape, they tend to restore their original cupped shape when the imposed load is relieved. This affects the frequency response of the unit to help diminish mechanical hysteresis. The term "negator" has been applied to the precoiled spring that rewinds itself after an imposed load is removed.

A preload adjusting device is provided to control the spacing between the encapsulated capacitive elements and the central mass. Unwanted play or looseness can thus be adjusted out, and a minimum preload setting obtained. When forces of high magnitude are being measured, it is necessary to make a tighter adjustment. The initial minimum capacitance values can be raised above the nonlinear slope encountered in low load conditions by tighter adjustment and regulated compression of the encapsulated elements. For example, the volume of 180 µµf. at 120 grams per square centimeter has been approximated.

The preload adjustment comprises a finely threaded screw element 26 which engages a complementarily threaded opening 28, one being provided in each side 12 of the cube body 10. Six preload adjustments are provided, two for each axis. They are used to preadjust the capacitive elements for the reasons above noted, and to center the mass in the physical center of the transducer body 10.

As will now be apparent, when the transducer is subjected to a vibrational or acceleration force, the dense central mass 14 tends to move either backward or forward, up or down, right or left. The movement compresses one set of capacitive elements, thus increasing its capacity, while it decreases pressure on the opposite set of capacitive elements and decreases their capacitance.

The transducer is adaptable for a variety of uses and the special use governs the type and detail of the circuitry to be used with it.

The following examples are given to illustrate uses of the transducer and it will be understood that the invention is not limited to these uses:

(1) As a weapon firing rate indicator and rounds counter, a standard capacitive bridge circuit would be used which would also be connected to an integration circuit and electronic counting device calibrated to give an indicated output in pulses per minute.

(2) To accomplish the basic function of measuring vibration, a standard peak reading A.C. voltmeter would be used in conjunction with the capacitive bridge.

(3) Acceleration is measured the same way, using a D.C. voltmeter or any type of graphic recorder. The output of the device, when used in conjunction with a capacitive bridge, will be a sine wave function whose amplitude is directly related to the amplitude of vibration. The frequency of the sine wave will be equal to the frequency of the vibration or to a harmonic.

(4) When using the device to determine the vectorial axis of a vibration plane, the three dual capacitive elements must first be equally calibrated as to output. The resultant direction is then determined by integration of all three outputs with respect to a fixed reference axis.

While the invention is shown and described in connection with one form for illustrative, rather than restrictive purposes, it is obvious that changes and modifications may be made by those skilled in the art without departing from the scope and spirit of the invention as defined in the accompanying claims.

We claim:
1. An omni-directional transducer system capable of receiving and transmitting for measurement vibrational and G-load forces from any direction, said system com- prising a cubical hollow body, six sides on said body, a movable mass of known density located in said body, six capacitor units, each unit comprising a plurality of flexible deformable capacitor plates and a plurality of dielectric elements placed in sandwiched formation, two capacitor units being located on each axis in said cube, one on each opposite side of said central mass, six pairs of negator spring elements, one negator of each pair located inwardly and one outwardly with respect to each of said capacitor units, a negator element being interposed between each capacitor unit and an interior side of said cube, and a negator element being interposed between each capacitor unit and said central mass, said central mass moving in response to vibrational and G-load changes to vary the distance between said capacitor plates and thereby vary the capacitance of each capacitor unit, terminals on said capacitor plates for connecting selected electrical measuring instruments for making desired observations, a preloading adjusting means located in each side of said cubical transducer body for removing looseness and play in the elements of said transducer, for locating said mass in balanced relationship to each capacitor unit and, when desired, for applying pressure to said capacitor plates for raising the capacitance values of said capacitor elements above the nonlinear slope.

2. An omni-directional transducer system for receiving and transmitting for measurement vibrational forces and G-load stresses, said system comprising a hollow cubical container comprised of six walls each wall provided with an opening therethrough, a spherical central mass of known density positioned therein free from attachment and rotatable therein, pairs of capacitor units located in balanced relationship around said central mass and positioned between said central mass and a wall of said cubical container, means for varying and adjusting the capacitance of each of said capacitor units from the exterior of said container, said means comprising adjusting members located and adjustable in said openings in said walls, the capacitance of each capacitor being subject to measurable change responsive to increased or decreased pressure placed thereon from within said container by movement of said central mass.

References Cited in the file of this patent

UNITED STATES PATENTS

| | | |
|---|---|---|
| 1,961,007 | Marvin | May 29, 1934 |
| 2,025,719 | Blau et al. | Dec. 31, 1935 |
| 2,340,213 | Ellsworth | Jan. 25, 1944 |
| 2,390,328 | Roberts | Dec. 4, 1945 |
| 2,892,152 | Buisson | June 23, 1959 |

FOREIGN PATENTS

| | | |
|---|---|---|
| 599,933 | Canada | June 14, 1960 |